United States Patent
Shatil

(10) Patent No.: US 7,266,538 B1
(45) Date of Patent: Sep. 4, 2007

(54) METHODS AND APPARATUS FOR CONTROLLING ACCESS TO DATA IN A DATA STORAGE SYSTEM

(75) Inventor: Arod Shatil, Chestnut Hill, MA (US)

(73) Assignee: EMC Corporation, Hopkinton, MA (US)

( * ) Notice: Subject to any disclaimer, the term of this patent is extended or adjusted under 35 U.S.C. 154(b) by 431 days.

(21) Appl. No.: 10/113,368

(22) Filed: Mar. 29, 2002

(51) Int. Cl.
*G06F 17/30* (2006.01)
*G06F 17/00* (2006.01)

(52) U.S. Cl. .................................. 707/1; 707/2; 707/9
(58) Field of Classification Search ............. 707/1–10, 707/100, 103, 104.1; 711/114, 108, 160; 705/51, 54
See application file for complete search history.

(56) References Cited

U.S. PATENT DOCUMENTS

| | | | |
|---|---|---|---|
| 6,148,417 A * | 11/2000 | da Silva | 714/25 |
| 6,507,849 B1 * | 1/2003 | Choudhary | 707/103 Y |
| 2002/0040364 A1 * | 4/2002 | Saito et al. | 707/9 |
| 2002/0144054 A1 * | 10/2002 | Fanning et al. | 711/108 |
| 2005/0005079 A1 * | 1/2005 | Boudou et al. | 711/156 |

* cited by examiner

*Primary Examiner*—Sam Rimell
*Assistant Examiner*—Mellissa M. Chojnacki
(74) *Attorney, Agent, or Firm*—Chapin IP Law, LLC; Barry W. Chapin, Esq.

(57) ABSTRACT

Mechanisms and techniques allow a host computer system to control memory management techniques within a data storage system. The host computer system can detect a requirement of the computer system to access data in the data storage system and can identify a data access policy based on the requirement of the computer system to access data. The host can then include, within a data access request, a data access policy identifier that corresponds to the identified data access policy. The host then transmits the data access request including the data access policy identifier to the data storage system. The data storage system receives the data access request and selects a data access policy based on the data access policy identifier. The selected data access policy defining a memory management technique to use within the data storage system. The data storage system configures itself to operate according to the memory management technique and services the data access request according to the data access policy.

11 Claims, 8 Drawing Sheets

| POLICY ID | REQUESTOR ATTRIBUTES | DATA ACCESS TECHNIQUE ATTRIBUTES | DATA ATTRIBUTES | OTHER POLICY ATTRIBUTES | MEMORY MANAGEMENT TECHNIQUE(S) |
|---|---|---|---|---|---|
| 1 | APPLICATION X | OPEN, READ | FILE Y | FILE < 1MB | PREFETCH Y ENTIRELY |
| 2 | APPLICATION Z | OPEN | FILE Q, FILE R, FILE S | 2:00PM - 6:00PM | CACHE 2 MB OF DATA FILE ABC |
| 3 | USER = DBADMIN | ANY ACCESS | DATABASE A | - | PERMACACHE DATABASE A |
| 4 | BACKUP APPLICATION | OPEN OR READ OR SEEK | ANY DATA | USER = BACKUP ADMIN | NO CACHING |
| 5 | TIMEFINDER APPLICATION | OPEN OR READ | ANY VOLUME | - | PREFETCH 2MB OF VOLUME |
| 6 | ANY APPLICATION | READ OR WRITE | VOLUME T | USER = JOE | PREFETCH 1MB AND CACHE FOR 1 MINUTE |

113
DATA ACCESS POLICY

FIG. 4

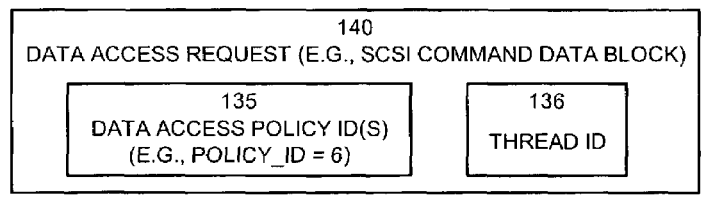

FIG. 5

METHODS AND APPARATUS FOR CONTROLLING ACCESS TO DATA IN A DATA STORAGE SYSTEM

FIELD OF THE INVENTION

The present invention generally relates to systems for managing data storage, and more particularly, to systems and techniques which provide host computer system control over data access and related operations within a data storage system.

BACKGROUND OF THE INVENTION

The rapid growth of information service and data processing industries has resulted in a need for data storage systems to efficiently manage and store large amounts of data. Typically, a data storage system that serves this need includes a plurality of high-capacity high-performance disk drives along with some processing circuitry that can store data to and retrieve data from the disk drives. To achieve high-performance when either storing or retrieving data on behalf of computer systems coupled to the data storage system, some data storage systems include an internal cache memory system that serves as an electronic buffer for data being transferred into (i.e. written) or out of (i.e., read from) the disk drives that operate within the data storage system. Since disk drives are highly mechanical in nature, they provide relatively slow access to data as compared to a cache memory system that is fully electronic. As such, a data storage system can use an internal cache memory system as a high-speed storage area for data for which host computer systems require access.

Certain conventional data storage systems are equipped with logic or processing circuitry that attempts to efficiently utilize an internal memory system such as a cache according to various memory management techniques. Efficient use of a cache memory system is generally preferable because a typical cache memory system is limited in size and is often shared for use by all host computer systems that request access to data within the data storage system. For example, if two host computer systems are coupled to the data storage system and are attempting to concurrently read respective streams of data from the data storage system, the data storage system may use a memory management technique to buffer portions of the stream of data into the cache. One conventional memory management technique that attempts to optimally utilize an internal cache memory system in this manner is called "predictive caching."

Predictive caching can detect a sequence of sequential or related access requests to sequentially located data locations within the data storage system. Upon detecting such a sequence, a predictive caching process in the data storage system can read ahead from a current physical storage location (e.g., from a most recent read operation) and can fill up a portion of the cache memory system with data that the predictive caching process "predicts" will be needed by future read requests. In this manner, predictive caching attempts to use data access pattern recognition techniques such as detecting multiple sequential reads from successively incremental physical disk locations to predict what data will be requested in the future. Based on this prediction, the predictive caching process can then access and cache data before the data storage system actually receives access requests for data.

To illustrate a more specific use of predictive caching, consider a scenario in which a host computer system is performing a sequential file access operation, such as might occur during a backup operation of a large file stored within the data storage system onto a tape. The sequential file access operation operates by reading the entire contents of the file byte by byte from physical data storage locations, starting at the beginning of the file and continuing to the end of the file. Without predictive caching, a data storage system would handle each read operation within the sequential file access operation as a separate and relatively slow access to data within the disk drives in the data storage system. However, a data storage system that uses predictive caching can detect the sequential pattern of data accesses and can read ahead from the current location in the sequence to place data into the cache memory system. Then, for subsequent read operations that occur during the sequential file access operation, the data storage system can attempt to service those read operations faster by using data from the cache memory system instead of having to service each read operation using disk drive processing circuitry that tends to be slower. By detecting access to sequential locations in the disk drives and reading data into the cache memory system before that data is requested, and by servicing future data access requests from the cache using that data, performance of the data storage system using predictive caching is somewhat increased.

Other conventional memory management techniques for use in a data storage system exist as well. For instance, some data storage systems, such as certain data storage systems of the Symmetrix line manufactured by EMC corporation of Hopkinton, Mass., include a cache control software interface which allows an application on a host computer system to externally control caching of data within the internal cache of the data storage system. For example, an application that routinely uses a specific file can include embedded calls to functions that are available within a cache control software interface which can instruct the data storage system to permanently cache the file within its internal cache memory system. In other words, specific cache control commands can be included within the software code of an application program. These commands use a cache control software interface provided by the data storage system to allow the application to specifically control how the data storage system is to perform memory management techniques on behalf of read and write requests (i.e., data access requests) from that application. After operating or executing a cache control call using such a software interface, as the application executes on the host computer system and requests access to the file from the data storage system, the data storage system can provide such access from its internal cache memory system instead of having to service such access requests via access to the disk drives in the data storage system.

SUMMARY OF THE INVENTION

There are a variety of shortcomings related to the aforementioned conventional mechanisms for controlling memory management techniques within a data storage system. As an example, conventional memory management techniques for operating a cache control software interface from within an application performing on a host computer system require that the software application code be modified to take advantage of such an interface. Typically, this requires that a software developer have knowledge of the existence of the cache control software interface during the software development process for that application, and that the developer have predetermined knowledge of how data storage system caching should operate for that application. The software developer must also access to the software code and must further have specialized knowledge about how to incorporate function calls that properly manipulate the cache control software interface to cause the data storage system to cache the appropriate data on behalf of the application incorporating such function calls. For pre-existing or legacy applications, the source code for such applications is rarely available to allow the incorporation of such custom function calls, and if it were available, significant amounts of evaluation, development, debugging and testing time must be spent in order to modify an existing application to take advantage of a cache control software interface or another interface that is used to control memory management techniques within a data storage system.

Since conventional mechanisms for operating data storage system memory management techniques typically use function calls built into the software application during its design, such data storage system memory management control mechanism are also not dynamically adjustable to changing conditions within the computer system operating the application. As an example, if different users operate the same application, there are no mechanisms in place using conventional data storage system memory management techniques to dynamically alter the operation of caching or other memory management techniques within the data storage system based upon which user is using the application. In addition, conventional techniques do not give consideration to other factors such as the type, name or size of data being accessed, time of access, or other such attributes. To this end, an application's operation of conventional memory management techniques within a data storage system are limited to hard-coded function calls which must be statically pre-configured during creation of the application and which do not take into account any external factors or criteria such as the usernames in the aforementioned example.

In addition, function calls to a specialized software interface provided by the data storage system to control memory management techniques within the data storage system can utilize significant interface bandwidth for each interface call required to configure the memory management techniques to operate properly. As an example, each system call made by a host application in a host computer system to a memory management or cache control interface provided by a data storage system requires transmission of a separate command over the interface between the host computer and the data storage system. Such out-of-band commands can consume interface resources that might otherwise be utilized for transfer of data access requests between the host and the data storage system and thus may slow down the overall throughput of data between the host computer and the data storage system.

Furthermore, conventional memory management techniques such as predictive caching rely on the ability to detect a pattern or sequence of sequential physical access requests to data storage locations within disk drives in the data storage system. It is not until a predictive caching process operating in a data storage system detects such a pattern or sequence that caching of data can occur. This results in the data storage system having to process a number of data access requests without caching prior to the predictive caching process detecting the sequence of sequential access request. In other words, predictive caching cannot begin to operate until the predictive caching process in the data storage system recognizes a data access pattern. Accordingly, predictive caching does not achieve a performance gain for data access requests that occur during the period of detection of a data access patterns.

Predictive caching also suffers in part from a problem related to caching unnecessary data. Once a predictive caching process within the data storage system detects a sequential access pattern to data, the predictive caching process caches a certain amount of data in the internal cache memory system within the data storage system. However, since the predictive caching process is unaware of precisely how much data is required to be cached, the predictive caching process may unknowingly cache more data than is actually required. This results in an inefficient use of the cache memory system that is an expensive resource within the data storage system. Predictive caching may cache unnecessary data in a variety of circumstances.

By way of example, consider a scenario in which a sequential file access operation is nearing completion of access to the file. During the sequential access operation, a conventional predictive caching process might periodically cache large blocks of data into the internal cache memory system in the data storage system in an attempt to anticipate future read requests for such data. However, when the sequential access operation has completed reading the last portion of data for the file being accessed, the sequential access operation no longer issues read requests for further data in the cache. However, since the predictive caching algorithm is unaware of the precise use of the data that is cached, the predictive caching algorithm, during its most recent predictive caching operation, may have cached significantly more data from physical disk locations that extend well beyond the physical disk locations corresponding to the end of the file being accessed. Accordingly, any data from physical disk locations after the end of the file that the predictive caching algorithm places in the cache will go unused. Such unnecessary cached data occupies cache resources that could be used for other caching operations.

Another problem with conventional data storage system memory management and caching techniques arises due to file and disk fragmentation issues. In computer systems that use open systems operating systems such as Unix, a single file created by the operating system may be physically stored in fragments that may be located across many non-sequential areas of one or more disk drives within a data storage system. In other words, certain operating systems allow a single file to be broken up into smaller fragments which may be respectively stored in unused areas within a data storage system which are large enough to accommodate the respective individual fragments. By fragmenting a file in this manner, physical disk space within a data storage system is put to optimal use. From the perspective of a software application on a host computer system however, file system processing within the operating system on the host computer system manages and tracks the diverse locations of the fragments of a file as a set of disk extents maintained by the file system. This allows the operating system to present the file logically to software applications as a single cohesive or continuous portion of data.

While fragmentation of files or other data may provide for optimal use of disk space, fragmentation poses problems to conventional data storage system memory management techniques such as caching operations. For example, returning to the aforementioned example of backing up a file, suppose the file is fragmented across a number of different physical locations within the disk drives of a data storage system. When the conventional predictive caching process in the data storage system detects the initial pattern of sequential read requests for data from the first fragment of the file, the predictive caching process attempts to read ahead from the most recent physical access location in the disk drive in order to cache data to service future read requests. However, as the backup process issues further read requests to backup data from locations of the file which span two non-sequentially located fragments of file data stored in the disk drives within the data storage system, the first read request for the first portion of data from a different fragment of the file will request data from the data storage system that is most likely not in the cache. This will result in a "cache miss" which decreases data storage system performance. The cache miss also causes the data storage system to retrieve the data from the disk drives at the location of the next fragment of the file, as specified in the most recent read request, instead of using cached data.

Moreover, fragmentation also causes the problem of caching unnecessary data because the most recent predictive caching operation most likely will have cached data that extends beyond the end of the file fragment. This data is not relevant to the stream of read requests from the backup process to obtain data from the file (e.g., in this example, predictive caching caches data which is not part of the file being backed up).

Further still, fragmentation causes a break in the predictive caching pattern of sequential read requests and thus the predictive caching process will not reinstate predictive caching again until the process can detect a sufficient number of read requests from another fragment of the file that establish a sequential access pattern. Such problems will be repeated over and over for each fragment as the physical locations of data being read from the file within the data storage system are sequentially broken from each fragment to the next.

Generally speaking then, conventional predictive caching memory management techniques, also sometimes referred to as conventional data "prefetching" techniques, are most beneficial for only truly sequentially arranged data such as that stored by mainframes. Such conventional memory management techniques can suffer to various degrees from the aforementioned problems when used for caching data that is arranged non-sequentially within a data storage system.

In contrast to the aforementioned conventional techniques for controlling and operating data storage system memory management techniques, the present invention provides systems, methods and techniques that significantly optimize the control and use of memory management techniques and other processing operations within data storage systems. In general, embodiments of the invention allow a host computer system to more precisely control cache operations within a data storage system in a variety of circumstances and do not require specific modification to applications within the host computer system. Instead, embodiments of the invention provide a host-based policy selector process that can detect requirements of the computer system to access data in the data storage system. As an example, the policy selector can intercept or otherwise detect requests for access to data (e.g., file system or other requests to read, write, open, seek, load, store, etc.) that occur within a host computer system. Embodiments of the invention can then identify a data access policy based on the detected requirement to access data.

Generally, a data access policy according to embodiments of the invention defines one or more memory management techniques to use within the data storage system based upon attributes associated with the requirement of the computer system to access data the (e.g., based on attributes or characteristics associated with a file system request such as a user, a name of the application, type of application, name, type and/or size of data for which access is requested, time and/or date of attempted access, access permissions, and the like). In general, embodiments of the invention compare attributes of the requirement to access data to a variety of data access attributes defined within a data access policy database (e.g., a policy table) to select a data access policy that most closely matches the attributes.

Upon identifying a data access policy, embodiments of the invention include, within a data access request, a data access policy identifier that corresponds to the selected data access policy(s). Data access requests are input-output requests generated by the host computer system based upon the requirement of the computer system to access data in the data storage system. As an example, when an operating system (e.g., a file system) receives a file system request to read or write data, the operating system converts the file system request into one or more I/O requests such as SCSI commands each containing a command data block. Embodiments of the invention are able to detect or intercept such I/O requests prior to being sent to the data storage system and are able to direct a device driver to insert data access policy identifier(s) (that correspond to the selected data access policy(s)) into a field of the I/O requests (e.g., an unused field in a SCSI command data block) in order to identify which data access policy is to be applied to these data access requests. The host computer system then transmits the data access request(s) including the data access policy identifier(s) to the data storage system to cause the data storage system to service the data access request(s) and to utilize the memory management technique(s) associated with and defined by the selected and identified data access policy(s) corresponding to the data access policy identifier(s) contained in those requests.

Embodiments of the invention also provide mechanisms and techniques that operate within a data storage system to control access to data based on these policy identifications. In particular, embodiments of the invention in a data storage system receive data access requests including data access policy identifiers from a host computer system that generated such requests, as briefly discussed above. A data storage system then selects the appropriate data access policy(s) based on the data access policy identifier(s) contained within the data access request(s). A selected data access policy defines a memory management technique to use within the data storage system with respect to those data access requests containing that policy identifier. Embodiments of the invention then configure the data storage system to operate according to the memory management techniques defined by the selected data access policy(s). The data storage system thus services the data access requests while operating the memory management techniques defined by the selected data access policy(s). In this manner, embodiments of the invention allow a data storage system to specifically identify which particular data access policies to apply which specific data access requests such as SCSI I/O requests. Data access policy memory management techniques can define things such as prefetching or predictive caching techniques to use for files being accessed by the data access requests.

Embodiments of the invention conserve interface bandwidth between the host computer system and the data storage system while still achieving the results of being able to selectively control memory management techniques within the data storage system. In addition, as will be explained in detail herein, data access policies within both the host computer system and the data storage system can be dynamically modified without requiring changes to an application. As such, memory management techniques can be changed, even during application runtime, with respect two how application data is cached within the data storage system at any time before, during, or after execution of the application and such changes will affect data access requests generated by the host computer system on behalf of file system requests made by the application. There is no need to modify application code in order two change the way in which the data storage system caches data or performs other memory management techniques on behalf of an application.

Embodiments of the invention also allow memory management techniques to be controlled based on the number of different attributes related to the detected requirement to access data (e.g., based on file system request attributes). As an example, a data access policy can be configured within the host computer system data to include attributes such as requester attributes that identify particular users, applications, hosts, data access techniques, or other attributes such as data sizes, access times, user permissions and the like. Selection of a data access policy can take into account any combination of these attributes in order to define a set of one or more memory management techniques to use within the data storage system during processing of data access requests (e.g., I/O requests) generated from a file system request, for example. Accordingly, precise control of memory management techniques within the data storage system is achieved depending upon the desired circumstances.

Other embodiments of the invention include host computer systems and data storage system configured to operate and perform all of the methods and techniques disclosed herein as the invention.

Other embodiments of the invention include software programs to perform the method operations disclosed herein. In particular, such embodiments include a computer program product having a computer-readable medium including computer program logic encoded thereon that when performed on a host computer system or data storage system, causes the host computer system or data storage system to control memory management techniques within the data storage system. In such embodiments, when the computer program logic is performed on a processor, the computer program logic causes the processor to perform any or all of the method operations disclosed herein as the invention. These embodiments of the invention are typically provided as software on a computer readable medium such as an optical medium (e.g., CD-ROM), floppy or hard disk or other such medium such as firmware in one or more ROM or RAM or PROM chips or as an Application Specific Integrated Circuit (ASIC). The software or firmware or other such configurations can be installed onto a host computer or data storage system to perform the techniques explained herein as embodiments of the invention.

It is to be understood that the system of the invention can be embodied strictly as a software program, as software and hardware, or as hardware alone. Is also to be understood that the processes of this invention typically perform (e.g., executes, runs, or is otherwise operated) on a host computer system and a data storage system (in either or both). Such a data storage system may be a simple single disk system or may be a highly complex large-scale file server, RAID array or other type of data storage system. An example of such a data storage system is the Symmetrix line of data storage systems manufactured by EMC Corporation of Hopkinton, Mass. The invention may also be embodied in software applications created by EMC Corporation of Hopkinton, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

FIG. 4 illustrates an example of a data access policy identifying attributes and corresponding memory management techniques according to an example embodiment of the invention.

FIG. 5 illustrates a data access request including a data access policy identification and thread identification configured according to one embodiment of the invention.

DETAILED DESCRIPTION OF PREFERRED EMBODIMENTS

Figure 1:
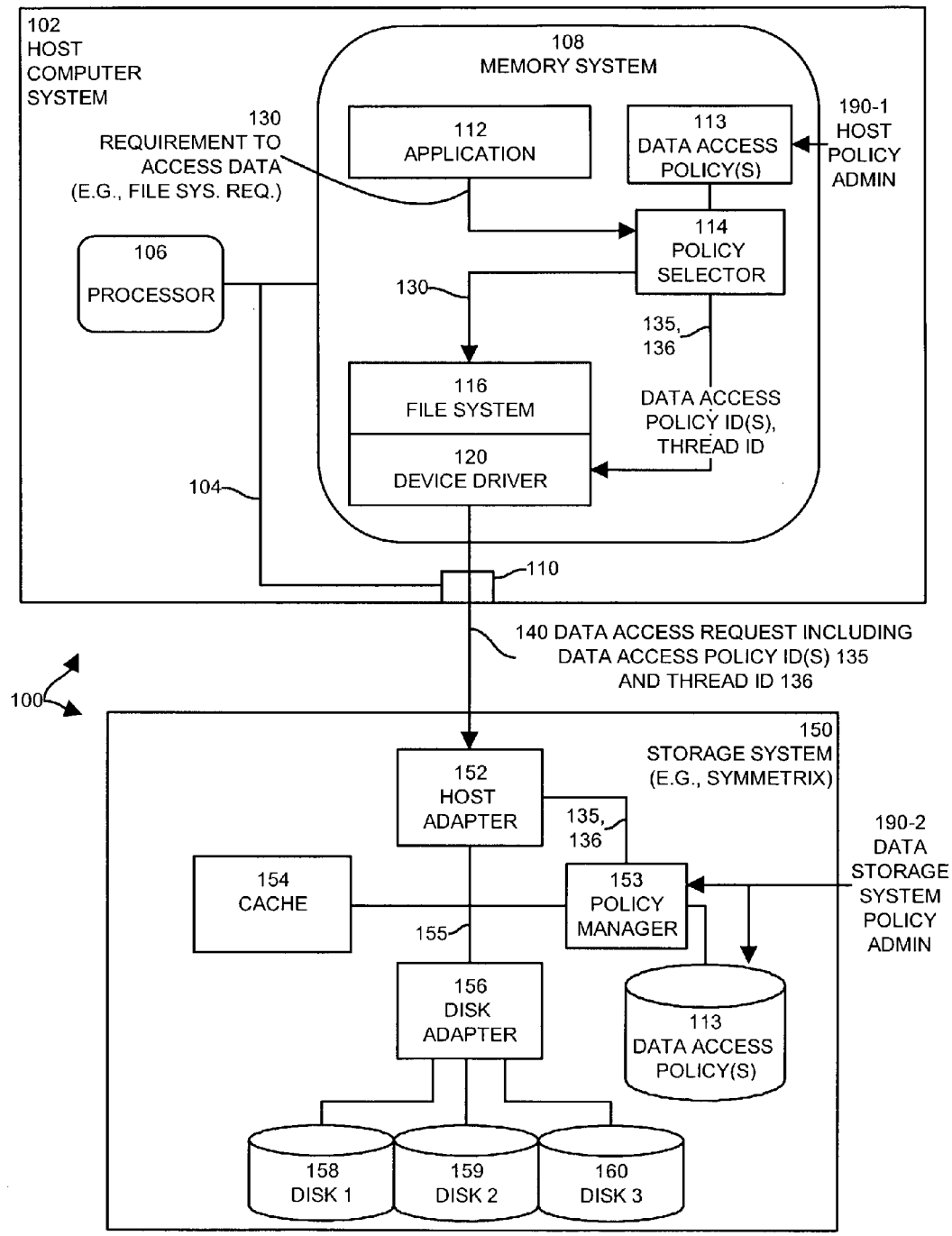
FIG. 1 illustrates a computing system environment including a data storage system coupled to a host computer system, each of which are configured according to one embodiment of the invention.

The present invention provides techniques and mechanisms that allow a host computer system to control memory management techniques within a data storage system. One embodiment of the invention operates as a policy selector within a host computer system to detect a requirement of the computer system to access data within the data storage system. As an example, embodiments of the invention can detect file system requests made by applications to access data stored within a data storage system. Such requests may originate from applications, programs or other processes that perform (e.g., execute) on a host computer system or another computer system coupled to the host (e.g., over a network). Once a requirement to access data is identified, embodiments identify one or more data access policies based on the requirement to access data. This may be done by comparing attributes associated with or related to the file system requests to data access policies defined in a database. The data access policies define respective memory management techniques that can be applied within the data storage system for data access requests generated based on the requirement to access data (e.g., I/O requests such as SCSI commands generated from the file system request). Once the data access policy(s) is/are identified, embodiments of the invention include, within data access requests to be sent to the data storage system, data access policy identifier(s) that correspond to the identity of the selected/identified data access policy(s). Embodiments then transmit the data access requests including the data access policy identifiers to the data storage system to cause the storage system to service the data access requests according to the memory management techniques specified by the data access policy identifiers.

Other embodiments operate as a policy manager within the data storage system. The policy manager also has access to the data access policy database. In operation, the data storage system receives one or more data access requests including data access policy identifier(s) and the policy manager selects a data access policy or policies from the data access policy database based on the data access policy identifier(s) contained in the data access requests. The policy manager then configures the data storage system to operate according to the memory management technique(s) defined by the selected data access policy(s). Once configured, the data storage system can service the data access requests while operating the memory management techniques defined by the selected data access policy(s).

Other embodiments of the invention cause a host computer system to include a thread identification within data access requests. This allows embodiments of the invention that operate in the data storage system to associate or collectively identify multiple data access requests generated in response to a single requirement to access data and to associate these requests to a common data access policy or policies. As an example, if a single file system request such as a READ request in a host computer results in the generation the many data access requests (i.e., many I/O READ requests), each data access request can contain the same thread identification as they are collectively associated with the same READ file system request. Accordingly, an initial or first data access request (i.e., the first I/O READ request) produced by the host as a result of the file system request can contain both a thread identification and a data access policy identifier that identifies a memory management technique to utilize on behalf of all data access requests containing the same thread identification. Upon receipt of subsequent data access requests containing the same thread identification at the data storage system, embodiments of the invention are able to process these subsequent data access requests according to the previously selected and identified data access policy that defines one or more memory management techniques to use for data access requests having that thread identification.

Accordingly, the policy selector operating within the host computer system needs to only identify a policy and insert the data access policy identification into the first of several data access requests generated as a result of the requirement to access data. Thereafter, since all data access requests will contain the same thread identification, each will be processed within the data storage system according to the memory management techniques associated with the data access policy selected by the first data access request containing that thread identification as well as the identification of that data access policy.

Embodiments of the invention substantially eliminate conventional data storage system memory management problems such as caching delay, caching unnecessary data and problems due to file fragmentation, and, further substantially eliminate the need to modify individual applications to use custom cache management or data storage system memory management software interfaces. In addition, embodiments of the invention can take into account a variety of factors when selecting a data access policy. One overall effect is to significantly increase the flexibility and optimal use of memory systems within data storage systems, thereby increasing overall data storage system performance.

FIG. 1 illustrates a computing system environment 100 that is suitable for use in explaining the general operation of example embodiments of the invention. The example computing system environment 100 comprises a host computer system 102 that includes an interconnection mechanism 104 that couples a processor 106, a memory system 108 and an interface 110 that couples the host computer system 102 to a data storage system 150. The memory system 108 is encoded with software processes, which include an application 112, a policy selector process 114 and data access policy(s) 113, configured in accordance with embodiments of the invention. Also included are a file system 116 and a device driver 120. The data storage system 150 includes an interconnection mechanism 155 that couples a host adapter 152, a policy manager 153, a cache memory system 154 and a disk adapter 156 which together manage data storage within a plurality of disk drives 158 through 160 (DISK 1, DISK 2, DISK 3).

Figure 2:
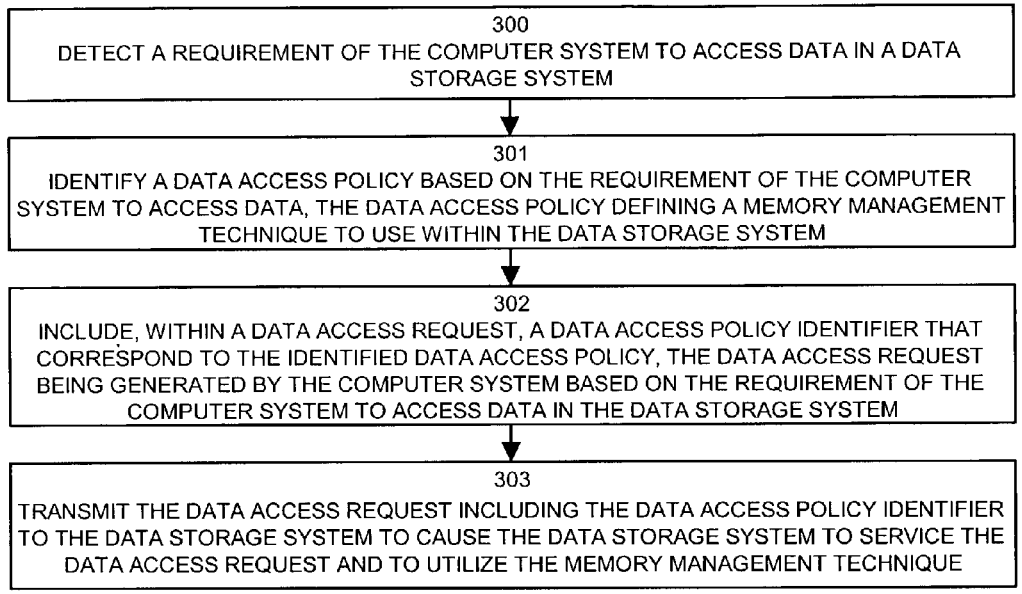
FIG. 2 is a flow chart of processing steps that shows details of the operation of a host computer system according to one embodiment of the invention.

The processing of the policy selector 114 within the host computer system 102 as configured according to embodiments of the invention will now be explained with respect to the flow chart of processing steps illustrated in FIG. 2.

In step 300, the policy selector operates within the host computer system 102 to detect a requirement 130 of the computer system 102 to access data within the data storage system 150. As illustrated in the example in FIG. 1, the requirement to access data 130 may be a file system request provided by the application 112 to the file system 116 (e.g., operating within an operating system, not specifically shown).

Next, in step 301, the policy selector 114 identifies the data access policy 113 based upon the requirement 130 of the computer system to access data. The data access policy 113 defines a memory management technique to use within the data storage system 150 on behalf of the requirement access data 130.

In step 302, the policy selector 114 operates in conjunction with the device driver 120 to include, within a data access request 140, the data access policy identifier 135. Also as illustrated in this example, the policy selector 114 identifies a thread identification 136 associated with requirement access data 130 and includes the thread identification 136 within the data access request 140 as well. An example of the thread identification might be a file system call request ID as contained in a file system request. The data access request 140 is generated by the device driver 120 based the requirement of the computer system 102 to access data within the data storage system 150. Generally, the device driver 120 in conjunction with the operation of the file system 116 produces a certain number of data access requests based on a single file system request, such as a request to write or read data. As an example, if the application 112 issues a write request to write 10 MB of data, the file system 116 and the device driver 120 may convert this request into many I/O requests (i.e., data access requests 140). The thread identification for each will be the same, since they all originated from the same file system request. In this embodiment of the invention, each data access request 140 is labeled to include the one or more data access policy identifiers 135 that designate one or more data access policies that define memory management techniques (e.g., a certain caching technique) that the data storage system 150 is to use when processing these data access requests 140.

Next, in step 303, the computer system 102 transmits the data access request(s) 140 including the data access policy identifier(s) 135 (and a thread identification 136 in the example in FIG. 1) to the data storage system 150 to cause the data storage system 150 to service the data access request(s) 140 and to utilize the memory management technique(s) specified by the data access policy(s) 113 corresponding to the data access policy identifier(s) 135 included therein.

In other words, as illustrated in the example in FIG. 1, the file system request 130 sent from application 112 to the file system 116 can be intercepted by the policy selector 114 in order to obtain a thread identification associated with that file system request. The policy selector 114 allows the file system request 130 to also be passed on to the file system 116. However, within the policy selector 114, as will be explained, attributes associated with the file system request 130 can be compared to a data access policy database 113 in order to select one or more data access policies 113 that should be applied to any data access requests 140 generated by the device driver 120 in response to receiving the file system request 130 from the file system 116. The policy selector 114 can interact with the device driver 120 to detect which data access requests 140 are associated with the file system request 130 and can cause the device driver 120 to insert the selected data access policy identifier(s) 135 (i.e., corresponding to the selected policies) and thread identifier 136 into those data access request 140 associated with the intercepted file system request 130. In this manner, each data access request 140 associated with the file system request 130 can identify a data access policy (one or more) corresponding to a memory management technique to be utilized within the data storage system 150 during processing of those data access request 140. As will be explained shortly, the data access policies define memory management techniques such as caching techniques and/or pre-fetching techniques that the data storage system 150 can utilize to manage memory such as the cache 154 on behalf of data access requests that specify such a data access policy.

As an example, the policy selector 114 can label the data access requests 140 that are associated with certain users, certain applications, or that request access to data of a certain size or type, to include data access policy identifiers 135 that indicate that certain prefetching or cache management techniques should be applied to these data access requests 140. Since the data storage system 150 operates a policy manager 153 that also has access to the data access policies (or to a subset thereof), the policy manager can invoke the appropriate memory management technique(s) based on the data access policy identifiers contained in the specific requests. Note that if a policy changes, those changes are reflected in the operation of the memory management techniques used in the data storage system 150. In addition, if an operational attribute of the application changes (e.g., the time day changes, a different file system request is issued, different data is accessed, etc.), the policy selector 114 might select or identify a different data access policy 113 based on the changing attributes of the request 130. As such, the data storage system operation of memory management techniques may change dynamically during runtime as different policies 113 are selected, or if such policies change.

Figure 3:
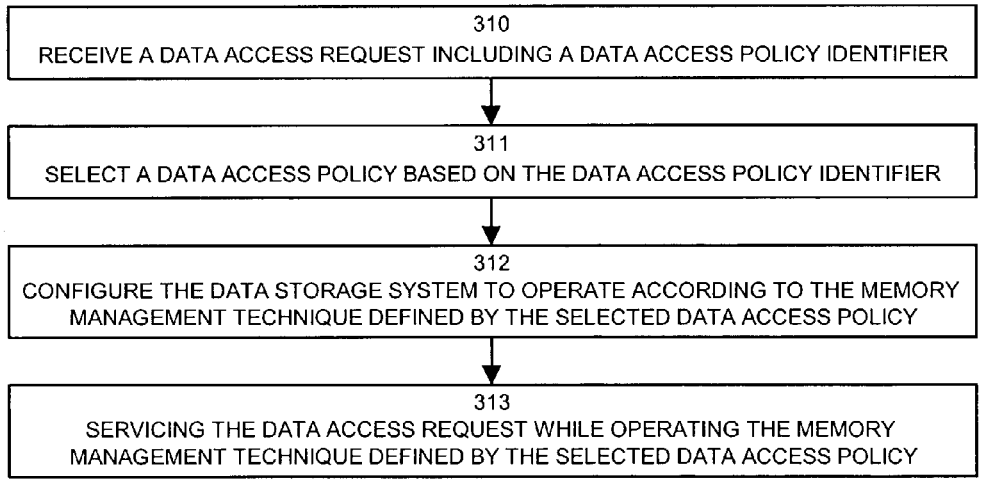
FIG. 3 is a flow chart of processing steps that shows details of the operation of a data storage system configured according to one embodiment of the invention.

FIG. 3 is a flow chart of processing steps which show the operation of a data storage system 150 configured according to one example embodiment of the invention.

In step 310, the data storage system 150 receives a data access request 140 including a data access policy identifier 135. The data access requests 140 can also contains a thread identification 136, as illustrated in the example in FIG. 1.

In step 311, the host adapter 152 allows the policy manager 153 to access or "see" the data access request 140 in order to select a data access policy 113 based upon the data access policy identifier 135 specified within the data access request 140. The thread identifier 136 can also be used in this selection process, as will be explained.

In step 312, the policy manager 153 configures the data storage system 150 to operate according to the memory management technique(s) defined by the selected data access policy 113. As an example, the data access policy may indicate that 2 MB of data should be prefetched into the cache 154 for each data access request 140 containing a specific data access policy identifier 135.

In step 313, the data storage system 150 services (i.e., processed) the data access request 140 while operating the memory management technique defined by the selected data access policy 113. Using the aforementioned example, components within the data storage system 150 such as the host adapter 152, disk adapter 156 and cache 154 operate to access data as required or specified in the data access request 140 (i.e., read or write data to the disks 158 through 160) while performing the memory management technique, such as prefetching 2 MB of data in addition to the data requested for access as specifically identified within the data access request 140.

Using the aforementioned techniques, embodiments of the invention do not require that an application developer specifically modify the code of an application 112 to take advantage of alternative memory management techniques within the data storage system 150. Since the data access I/O requests 140 are processed using memory management techniques that are policy based and that are selected based on various attributes of a requirement access data 130, such as by comparing various attributes of a file system request, as requirements of the application 112 change, different data access policies 130 can be selected using a rule or attribute-based data access policy selection technique as will be explained shortly.

FIG. 4 illustrates an example of a data access policy database 113 configured according to one example embodiment of the invention. In this example, the data access policy 113 is represented as a table where and each row represents a set of attributes 402 through 405 that the policy selector 114 can use to match a requirement to access data 130 against in order to identify particular memory management technique(s) 406 to be applied in the data storage system 150 (i.e., in order to obtain the correct data access policy identifier(s)). In this example, the data access policy 113 defines rows of requester attributes 402, data access technique attributes 403, data attributes 404 and other policy attributes 405. For a particular row of attributes values, one or more corresponding memory management techniques 406 are defined in the corresponding memory management technique column 406 for that set of attributes (i.e., for that row). The specific data access policy identifier 135 (collectively shown as column 401) for a particular specification of memory management technique(s) 406 is thus selected by the policy selector 114 to be included within at least one data access request 140 sent to the data storage system 150, as previously discussed.

As a specific example, directing attention to the data access policy row defined by data access policy identifier "2", if any user operates a software application 112 on the host computer system 102 (i.e., configured with this particular data access policy 113) named "APPLICATION Z" and performs an "OPEN" data access operation (i.e., issues an open file system request 130) on any of the files named "FILE Q," "FILE R" or "FILE S" between 2 PM and 6 PM, then a memory management technique is to be performed in the data storage system 150 that caches 2 MB of the data file named "ABC" into the cache 154. Accordingly, if a file system request 130 is sent by the APPLICATION Z and the other attributes 403 through 405 specified in this table match their corresponding values, the policy selector 114 will insert the value "2" as a data access policy identifier into all data access requests 140 generated on behalf of such a file system request 130 matching these attributes. As a result, the data storage system 150 will operate the policy manager 153 according to the operations discussed above with respect to FIG. 3 in order to perform the memory management technique 406 of caching 2 MB of the data file named "ABC" upon receipt of a data access request 140 containing the data access policy identifier 135 having a value "2".

It is to be understood that other types of attributes can be used besides those illustrated in the example data access policy 113 shown in FIG. 4. If attention is directed to other attribute values in the example data access policy 113 in FIG. 4, it will be understood that the policy selector 114 can consider other types of attributes besides those given in the above example. In the illustrated example in FIG. 4, consideration can be given to data access attributes such as open, read, seek, write, to different types of users or software applications requiring such access, to different types of data or volumes of data to which access is requested, to different sizes of data for which access is requested, and to different times or dates during which such access is requested. This list is not meant to be limiting to embodiments of the invention.

In addition, for a specific set of matching attributes, more than one memory management technique 406 can be specified. As an example, for data access policy identifier "6," the memory management techniques indicate that 1 MB of data is to be prefetched and such data is to be cached for one minute of time after the prefetch operation. This is an example of specifying multiple types of memory management techniques to use on behalf of one or more data access requests 140.

FIG. 5 illustrates an example of a data access request 140 such as a SCSI command data block that contains one or more data access policy identifiers 135 and an example thread identification 136. As briefly discussed above, in some embodiments of the invention, the policy selector 114 need not include the data access policy identifier within each data access request 140 to which a particular selected memory management technique and data access policy are to be applied. Instead, once the policy selector 114 identifies a data access policy 113 as being identified with a particular requirement access data 130, the policy selector 114 can label a single or initial data access request 140 with the data access policy identification 135. The device driver 120 may inherently label all data access requests 140, such as SCSI command data blocks, with a thread identification 136 so that upon return of the data from the data storage system for a particular group of data access requests 140, the device driver 120 can pass the results of the data access requests 140 back to the file system 116 which can return them to the appropriate file system request 130 for the correct application 112. Accordingly, if the policy selector 114 causes a data access policy identifier 135 to be placed into a single or initial data access request 140 containing a certain thread identification 136, the policy manager 153 in the data storage system 150 can from then on associate all data access requests 140 having the same common thread identification 136 to be processed according to the same memory management technique as most recently defined by the data access policy identification 135 received in a formerly processed data access request 140 having the same thread identification 136 as those subsequent data access requests 140. In this manner, interface bandwidth between the host computer system 102 and the data storage system 150 is conserved by not requiring embodiments of the invention to label or include a data access policy identifier 135 within every single data access request 140 associated with a particular thread identification 136 (i.e., associated with a particular file system request or other requirement access data 130).

Figure 6:
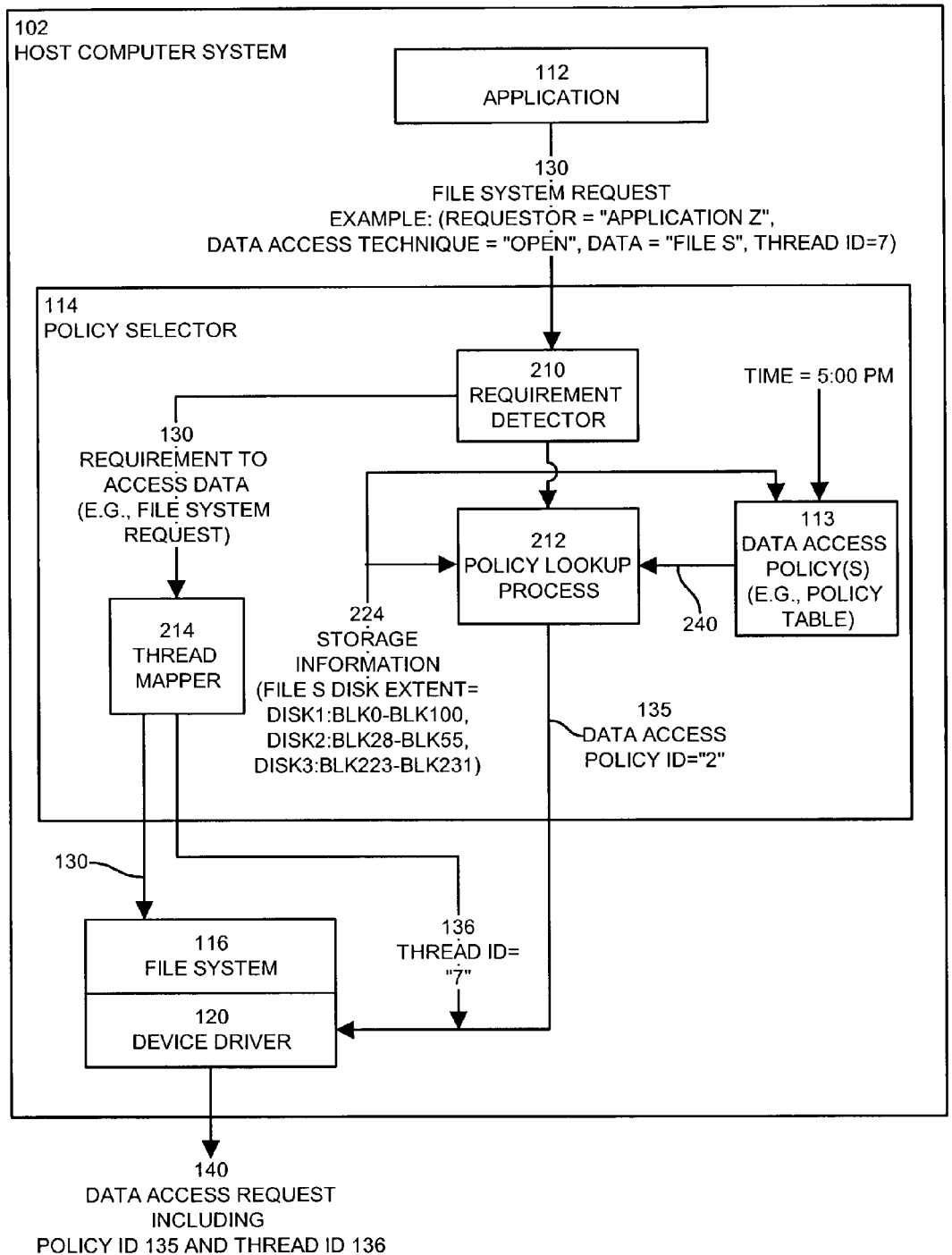
FIG. 6 illustrates architecture of a host computer system configured with a policy selector configured according to one example embodiment of the invention.

FIG. 6 illustrates an example architecture of a host computer system 102 including a policy selector 114 configured according to one embodiment of the invention. The policy selector 114 includes a requirement detector 210, a policy lookup process 212 and a thread mapper 214. In this example, the requirement detector 210 receives a file system request 130 and can determine that the APPLICATION Z is requesting to OPEN a file name FILE S and this file system request 130 has a thread identification of "7". The requirement detector 210 passes these attributes to the policy lookup process 212 for comparison to one or more data access policies 113. Depending upon the what attributes are required of the file system request 130 in comparison to a specific set of data access policy requirements (e.g., depending upon what attributes are contained in row of the table in FIG. 4), the policy lookup process 212 may also obtained storage information 224 such as disks extent information that indicates storage locations upon a particular set of disks within the data storage system a particular file (e.g., the locations of FILE S) resides. In other words, the policy lookup process 212 may require this information as part of the attribute information used to compare against the data access policies 113 to select a particular memory management technique 406 (FIG. 4). Once one or more data access policy identifications 135 (e.g., values 401) from rows in the policy table, the policy identification(s) 135 is passed to the device driver 120.

The thread mapper 214 within the policy selector 114 also receives the requirement to access data 130 from the requirement detector 210. From this information, the thread mapper 214 can determine or otherwise access the thread identification 136 associated with this particular file system request 130. The thread mapper provides this thread identification 135 to the device driver 120. The device driver 120, under direction from the policy lookup process 212, then inserts the selected data access policy identification 135 into all data access requests 140 that match the respective thread identification 136 received from the thread mapper 214. In this manner, the device driver 120 is able to determine which data access requests 140 are to contain which specific data access policy identifications 135.

Figure 7:
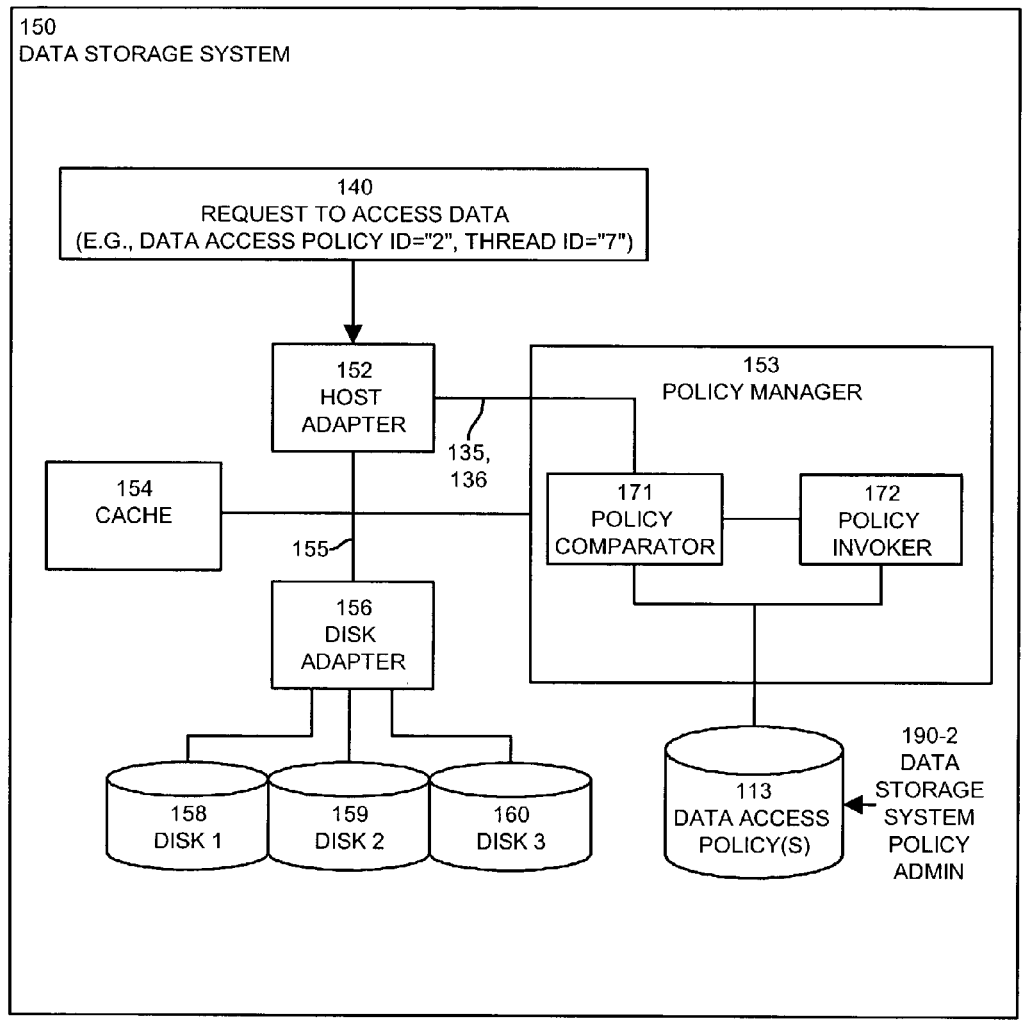
FIG. 7 illustrates architecture of a data storage system including a policy manager configured according to one example embodiment of the invention.

FIG. 7 illustrates an architecture of a data storage system 150 including a policy manager 153 configured according to one example embodiment of the invention. Generally, in operation of this example data storage system 150, the host adapter 152 receives data access requests 140. The data access requests 140 may include a data access policy identification 135 and a thread identification 136. The host adapter 152 passes the data access policy identifier 135 and thread identifier 136 into the policy manager 153 for receipt by a policy comparator 171. The policy comparator 171 compares the value of the data access policy identifier 135 to the available data access policies 113 to select the appropriate data access policy(s) 113 to invoke within the data storage system to perform memory management techniques 406 specified by those policies 113. Once the policies 113 have been selected in this manner, the policy comparator 171 passes the policy selections to the policy invoke or 172 which configures the data storage system 150 to operate according to the memory management techniques defined by the selected data access policies 113. As an example, the policy invoker 172 can cause the cache 154 to perform any prefetch or permacache operations on data associated with the data access request 140.

Figure 8:
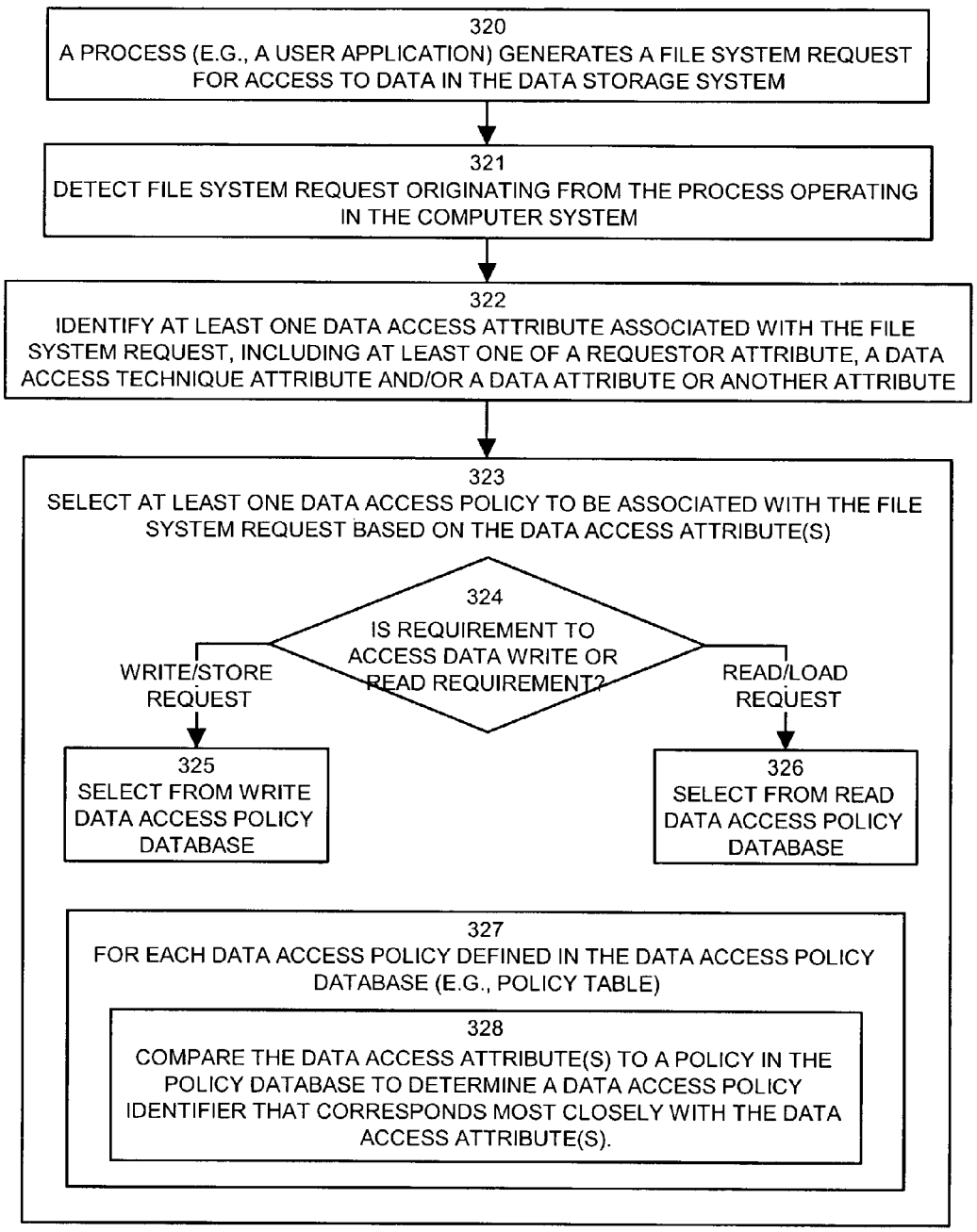
FIGS. 8 and 9 are a flow chart of processing steps that show an example operation of a host computer system equipped with a policy selector operating according to one embodiment of the invention.
Figure 9:
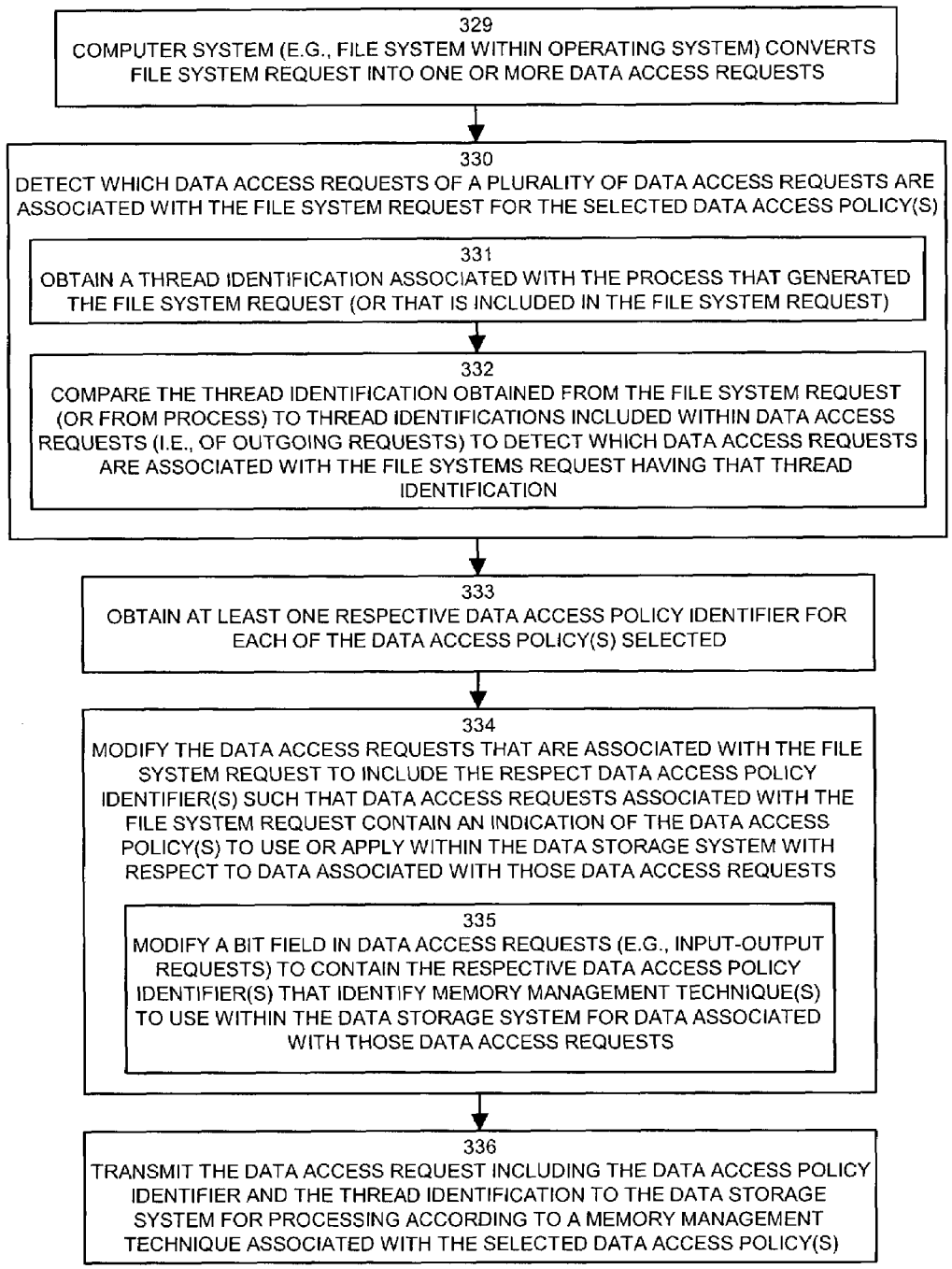
Figure 10:
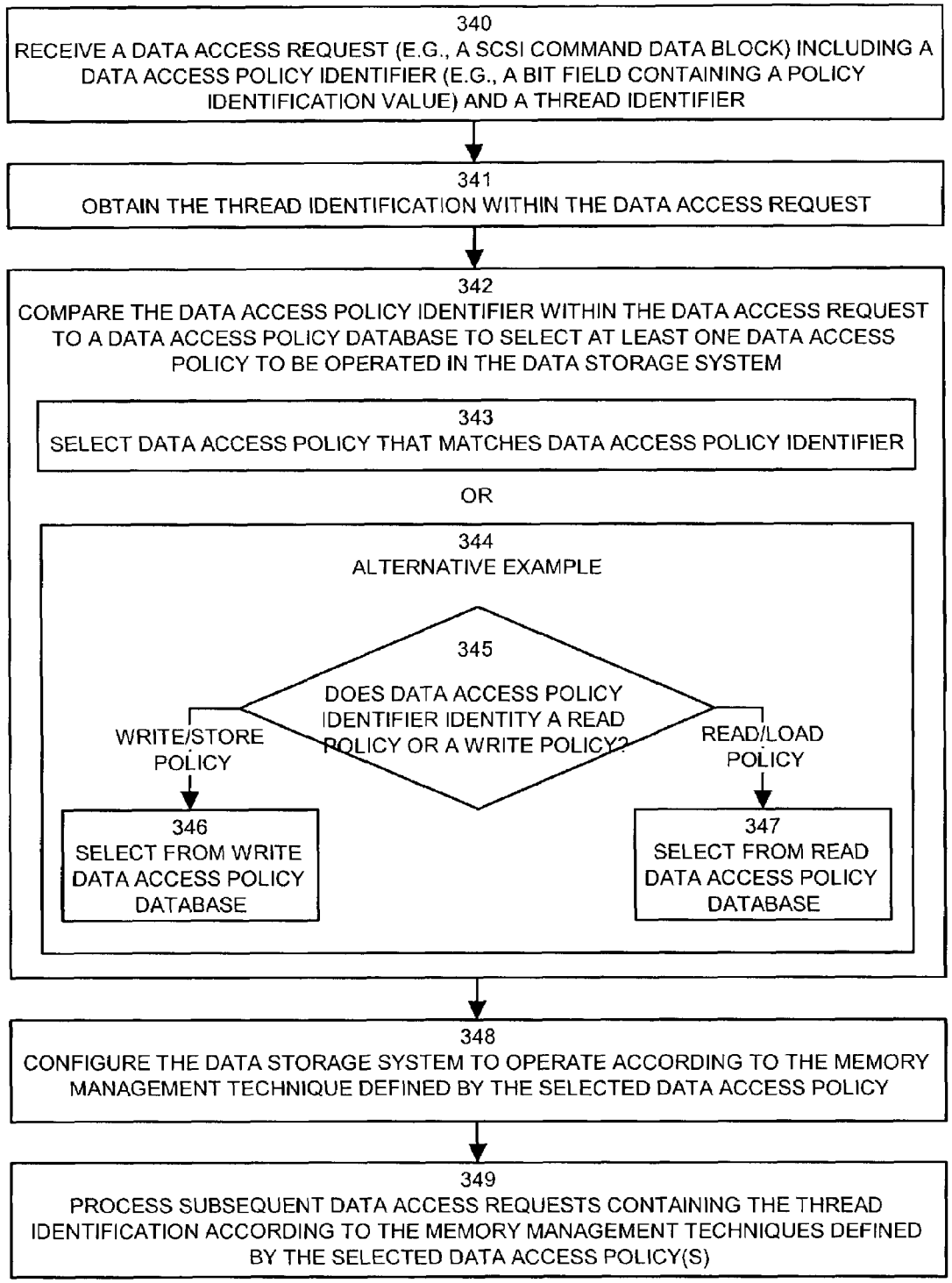
FIG. 10 is a flow chart of processing steps that show an example of a data storage system equipped with a policy manager configured according to one embodiment of the invention.

Further details of the operation of a host computer system 102 configured with a policy selector 114 and a data storage system 150 configured with a policy manager 153 configured according to embodiments of the invention will now be provided with respect to the flow chart of processing steps shown in FIGS. 8 and 9 (40 policy selector 114 operating a host computer system 102) and FIG. 10 (for a policy manager 153 operating within a data storage system 150).

FIGS. 8 and 9 provide a flow chart of processing steps that show operations of a host computer system 102 configured with a policy selector 114 configured according to one example embodiment of the invention.

In step 320, a process or application such as the application 112 operating within the host computer system 102 generates a file system request 130 for access to data within the data storage system 150.

In step 321, the policy selector 114 detects the file system request 130 originating from the application process 112 operating in the computer system 102.

In step 322, the policy selector 114 identifies at least one data access attribute associated with the file system request 130. The data access attribute(s) identified in step 322 can include, but are not limited to, requestor attributes 402 (FIG. 4), data access technique attributes 403, data attributes 404 and/or other attributes 406 related to the file system request 130. Generally, the policy selector 114 can obtain any information related to the file system request 130. Other attributes obtainable by the policy selector 114 can be things such as the time of the day, disk extents, and any other process or user information related to the application 112 that provides the file system request 130, or any attributes related to the computer system 102 that supplied the request 130, such as a host name of the host computer system 102.

Next, step 323, the policy selector 114 selects at least one data access policy 113 to be associated with the file system request 130 based on the data access attributes obtained or identified in step 322.

Two alternative techniques are illustrated within step 323 for selecting a data access policy 113 (one or more) to be associated with the file system request 130. In one alternative, as illustrated by steps 324 through 326, there can be separate classes of data access policies such as read and write policies. Write data access policies can define and applies certain memory management techniques when data is be written to a disk, while read data access policies can apply a different set of memory management techniques within the data storage system 150 when information is to be read from the disks.

In steps 324 through 326, according to one embodiment of the invention, the policy selector 114 can determine if the requirement to access data, which is a file system request 130 in this example, is a write requirement or a read requirement (step 324). If the file system request 130 is a write or store file system request that is transferring data to the data storage system 150 for storage within a disk 158 through 160, processing proceeds to step 325 at which point the policy selector 114 selects a specific write data access policy from a write data access policy database.

Alternatively, if step 324 determines that the file system request 130 is a read or load request to retrieve data from the data storage system 150, processing proceeds to step 326 at which point the policy selector 114 selects a read data access policy from a read data access policy database. In this manner, depending upon whether data is to be written to or read from the data storage system 150, different classes of data access policies defining different memory management techniques can be selected.

Steps 327 and 328 illustrate another technique for selection of a data access policy based upon data access attributes associated with the file system request 130.

In step 327, the policy selector 114 begins selection of a data access policy by entering a processing loop that is performed for each data access policy 113 defined in the data access policy database (e.g., in the data access policy table such as the one shown in FIG. 4).

Within this processing loop defined by step 327, in step 328, the policy selector 114 compares the data access attributes obtained in step 322 to the current policy row in the policy database 113 (i.e., to the policy row being processed in this iteration of the loop defined by step 327) to determine a data access policy identifier 401 that corresponds most closely with the data access attributes obtained step 322. In other words, in steps 327 and 328, the policy selector 114 compares all of the identified attributes 322 to the various attribute values which define each data access policy 113 in the data access policy database such as that illustrated in FIG. 4. For each row in which the data access attributes obtained in step 322 correspond to those attributes listed for that data access policy entry (i.e., that row in the data access policy table 113), the policy selector 114 obtains the data access policy identifier 401 that corresponds to the memory management techniques 406 for those matching attributes 402 through 405. Accordingly, after the processing of step 327 has completed for all rows of the data access policy table 113 (e.g., FIG. 4), there may be one or more data access policy identifiers 401 selected from the data access policy table 113 which identify the set of data access policies which are to be invoked within the data storage system 150 during processing of data access requests 140 generated as a result of the file system request 130.

After processing of step 323 is complete in FIG. 8, processing proceeds to step 329 at the top of FIG. 9.

In step 329, the host computer system 102, and in particular, the file system 116 within, for example, an operating system executing on the host computer system 102, converts the file system request 130 into one or more data access requests 140. For purposes of this explanation, a data access request 140 is an input-output (I/O) request such as a SCSI command data block that can be transferred from the device driver 120 operating in the host computer system 102 via a peripheral interface to the host adapter 152 of the data storage system 150. The processing performed by the file system 116 and/or the device driver 120 to convert a file system request 130 into one or more data access request 140 will no be briefly explained.

When a data storage system 150 processes a data access request 140 and returns resulting data (e.g., in the example of the data access request 140 to read a portion of data from the data storage system), the device driver 120 and/or the file system 160 require a way to associate the data returned from the data storage system 150 back to the application 112 that provided the original file system request 130. Accordingly, the process of converting the file system request 130 into one or more data access requests 140 includes generating a thread identification 136 associated with the file system request 130 and including within each data access request 140 a specific thread identification 136 which associates those data access requests 140 to that particular file system request 130.

As will be explained next, as a result of the creation of this unique thread identification which associates a group of one or more data access requests 140 to a specific file system request 130, the policy selector 114 can interface with the device driver 120 (or optionally with the file system 160 depending upon implementation) in order to obtain the thread identification 136 associated with the file system request 130. In doing so, the policy selector 114 is able to direct the device driver 120 to insert the data access policy identifier 135 into only those specific data access requests 140 associated with the file system request 130 based upon the thread identification 136.

To this end, in step 330 the policy selector 114 interfaces with the device driver 120 (in the example illustrated in FIGS. 1 and 6) in order to detect which data access requests 140 of a plurality of data access requests (of all data access request produced by the device driver 120) are associated with the file system request 130 for the selected data access policy 135.

As illustrated in step 331 this processing includes obtaining a thread identification 136 associated with the process or application that generated the file system request 130 (or that is included within the file system request 130).

Next, in step 332, the policy selector 114 compares the thread identification obtained from the file system request 130 (i.e., that is associated with this request 130) to the thread identification 136 included within data access requests 140 (i.e., within outgoing requests 140 prepared by the device driver 120) in order to detect which data access requests 140 are associated with the file system request 130 having data thread identification 136. In other words, the processing of steps 331 and 332, as generally recited by step 330 allows the policy selector 114 to figure out which data access requests 140 are associated with the file system request 130 for which the policy selector 114 has identified one or more data access policies 113 that are to be applied within the data storage system 150.

Next, in step 333, the device driver 120 under direction of the policy selector 114 obtains the respective data access policy identifier (or identifiers) 135 for each of the data access policies 113 selected by the policy selector 114. In other words, in step 333, the policy selector 114 provides the data access policy identifications 135 to the device driver 120 for insertion into the data access requests 140 that have the associated thread identification 136 corresponding to the file system request 130 for which those policy identifiers 135 correspond.

In step 334 the device driver 120 under direction of the policy selector 114 modifies the data access requests 140 that are associated with the file system request 130 to include the respective data access policy identifier 135 (or identifiers if multiple policies were selected) such that data access requests 140 associated with the file system request 130 contain an indication of the data access policies 113 to use or apply within the data storage system with this data to data associated with those data access requests 140.

As illustrated in the example sub-step 335, the device driver 120 under the direction of the policy selector 114 can modify a bit field within the data access requests 140, which may be input-output SCSI command data block requests, to contain the respective data access policy identifiers 135 that identify memory management techniques to use within the data storage system 150 for data associated with those data access requests 140.

Next, in step 336, the host computer system transmits the data access request 140 including the data access policy identifier(s) 135 and the thread identification 136 to the data storage system 150 for processing according to the memory management technique associated with the selected data access policy(s) 113.

FIG. 10 is a flow chart of processing steps performed by a data storage system 150 operating a policy manager 153 configured according to one example embodiment of the invention. Generally, the flow chart of processing steps shown in FIG. 10 illustrates a processing of data access requests received by the data storage system 150 unprepared according to the techniques discussed above with respect to the processing steps shown in FIGS. 8 and 9.

In step 340, the host adapter 152 within the data storage system 150 receives a data access request 140 such as a SCSI command data block that includes a data access policy identifier 135 (which may be a bit field containing a policy identification value 404 from FIG. 4) and a thread identifier 136. As illustrated in FIGS. 1 and 7, the host adapter 152 makes this information available to the policy manager 153.

In step 341, the policy manager 153 obtains the thread identification 136 within the data access request 140.

Next, in step 342, the policy manager 153 compares the data access policy identifier 135 within the data access request 140 to a data access policy database 113 to select at least one data access policy to be operated in the data storage system 150. Depending upon which embodiment of the invention is implemented, the processing of step 342 can be performed in a variety of ways.

As illustrated in step 343, the policy manager 153 can select a data access policy 113 that matches the data access policy identifier 135 by simply selecting those policy identifications 401 (e.g., FIG. 4) that match the corresponding data access policy identifier 135, such as shown in the example data access policy 113 illustrated in FIG. 4.

Alternatively, as illustrated by the processing of step 344 and sub-steps 345 through 347, the policy manager 153 can determine if the data access policy identifier 135 within the data access request 140 identifies a read data access policy or a write data access policy. If the data access policy identifier 135 identifies a write or store data access policy, processing proceeds to step 346 at which point the policy manager 153 selects a data access policy 113 from a database of write access policies.

Alternatively in step 347, if step 345 determines that the data access policy identifier 135 identified or corresponds with a read or load data access policy, the policy manager 153 selects a read data access policy from a read data access policy database.

The processing of steps 344 through 347 illustrates that embodiments of the invention can provide separate policies depending upon different types of access required. In particular, for data access requests that attempt to store data, certain types of write access policies may be desired for use within a data storage system 150, whereas if a data access request is requesting to read data from the data storage system 150, other types of read data access policies may be desired to be invoked.

After selection of one or more data access policies 113 which define corresponding memory management techniques 406 (FIG. 4), processing proceeds to step 348.

In step 348, the policy manager 153 configures the data storage system 150 to operate according to the memory management technique or techniques defined by the selected data access policy or policies 113. In this manner, the particular memory management operations associated with the data access policy can be implemented.

Next, in step 349, the policy manager 153 configures the host adapter 152 to cause the data storage system 150 to process subsequent data access requests 140 containing the thread identification 136 obtained in step 341 according to the memory management techniques implemented for the selected data access policies chosen and configured in steps 342 through 348. In this manner, subsequent data access requests associated with the same file system request 130 are processed in a similar manner.

Those skilled in the art will appreciate that other variations are also possible. For example, the flow charts of processing steps as explained above described processing events in certain sequences. It is to be understood that modifications to the order of these processing steps is possible while still achieving the objectives of the system of the invention.

It is also to be understood that not all data access requests 140 require inclusion of a data access policy identifier 135. As such, the policy selector 114 operating in the host computer system 102 can, in effect, tag or label an initial data access request 140-1 associated with a file system request 130 with one or more policy identifiers 135 that identify one or more memory management techniques to apply to all data access requests 140-2 through 140-N associated with this file system request 130. Once a single request 140 is tagged in this manner, the data storage system 150 can be configured according to embodiments of the invention to apply the memory management technique(s) associated with this selected data access policy 113 to all subsequent requests 140 until instructed otherwise to either change to a different data access policy or to disable the memory management techniques currently being performed for these data access requests. In this manner, by tagging only certain data access requests 140 as they leave the host computer system 102 with a policy identifier 135, interface bandwidth is minimized while still achieving the advantages of application memory management techniques to a large group of data access requests 140.

Such variations are intended to be covered by the scope of this invention. As such, the foregoing description of embodiments of the invention are not intended to be limiting. Rather, any limitations to embodiments of the invention are presented in the following claims.

What is claimed is:

1. In a computer system, a method for controlling access to data in a disk-based data storage system, the method comprising the steps of:

detecting a requirement of the computer system to access data in the disk-based data storage system, the detecting comprising detecting a file system request originating from a process operating in the computer system for access to data in the data storage system;

identifying a data access policy based on the requirement of the computer system to access data, the data access policy defining a memory management technique to use within the data storage system, the memory management technique including at least one of a cache determination and a prefetch determination, the data access policy based on at least two of the group including requester attributes, data access technique attributes, data attributes, and policy attributes; and including, within a data access request, a data access policy identifier that corresponds to the identified data access policy, the data access request being generated by the computer system based on the requirement of the computer system to access data in the disk-based data storage system, and wherein said including, within a data access request, a data access policy identifier comprises the steps of:

detecting which data access requests of a plurality of data access requests are to be transmitted to the data storage system and that are associated with the file system request for which at least one data access policy is selected;

obtaining at least one respective data access policy identifier for each of the at least one selected data access policy; and modifying the data access requests that are associated with the file system request to include the at least one respective data access policy identifier such that data access requests associated with the file system request contain an indication of the data access policy to use within the data storage system with respect data associated with those data access requests;

transmitting the data access request including the data access policy identifier to the disk-based data storage system to cause the disk-based data storage system to service the data access request and to utilize the memory management technique; and determining, with a thread mapper, thread identification associated with a file system request and providing said thread identification to a device driver.

2. The method of claim 1 wherein the step of selecting at least one data access policy comprises the step of:

comparing the at least one data access attribute to a host policy table to determine a data access policy identifier that corresponds most closely with the at least one data access attribute.

3. The method of claim 1 wherein the data access requests are input-output requests and wherein the step of modifying the data access requests that are associated with the file system request to include the at least one respective data access policy identifier comprises the step of:

modifying a bit field in the input-output request to contain the at least one respective data access policy identifier that identifies a memory management technique to use within the data storage system with respect to data access requests containing the at least one respective data access policy identifier.

4. The method of claim 1 wherein the step of identifying a data access policy comprises the steps of:

determining if the requirement of the computer system to access data in the data storage system is at least one of a write requirement or a read requirement; and if the requirement of the computer system to access data in the data storage system is a write requirement, selecting a write data access policy; and if the requirement of the computer system to access data in the data storage system is a read requirement, selecting a read data access policy.

5. The method of claim 1 wherein the memory management technique defined by the data access policy defines a memory management technique that controls at least one of a caching behavior and a prefetch behavior with the data storage system.

6. A computer system comprising:
a processor;
an interface coupled to a data storage system;
a memory system;
an interconnection mechanism coupling the processor, the interface and the memory system;
wherein the memory system is encoded with a policy selector application that when performed on the processor, produces a policy selection process for controlling access to data in a disk-based data storage system by causing the host computer system to perform the steps of:
detecting a requirement of the computer system to access data in the disk-based data storage system, the detecting comprising detecting a file system request originating from a process operating in the computer system for access to data in the data storage system;
identifying a data access policy based on the requirement of the computer system to access data, the data access policy based on at least two of the group including requester attributes, data access technique attributes, data attributes, and policy attributes, the data access policy defining a memory management technique to use within the data storage system, the memory management technique including at least one of a cache determination and a prefetch determination;
including, within a data access request, a data access policy identifier that corresponds to the identified data access policy, the data access request being generated by the computer system based on the requirement of the computer system to access data in the data storage system and wherein when the computer system performs the step of including, within a data access request, a data access policy identifier, the computer system performs the steps of:
detecting which data access requests of a plurality of data access requests are to be transmitted to the data storage system and that are associated with the file system request for which at least one data access policy is selected;
obtaining at least one respective data access policy identifier for each of the at least one selected data access policy; and
modifying the data access requests that are associated with the file system request to include the at least one respective data access policy identifier such that data access requests associated with the file system request contain an indication of the data access policy to use within the data storage system with respect data associated with those data access requests;
transmitting, over the interface the data access request including the data access policy identifier to the data storage system to cause the storage system to service the data access request and to utilize the memory management technique; and
determining, with a thread mapper, thread identification associated with a file system request and providing said thread identification to a device driver.

7. The computer system of claim 6 wherein when the computer system performs the step of selecting at least one data access policy the computer system performs the step of:
comparing the at least one data access attribute to a host policy table to determine a data access policy identifier that corresponds most closely with the at least one data access attribute.

8. The computer system of claim 6 wherein the file system request includes a thread identification associated with the process that originated the file system request and wherein when the computer system performs the step of detecting which data access requests of a plurality of data access requests are associated with the file system request, the computer system performs the step of:
obtaining the thread identification included in the file system request; and
comparing the thread identification obtained from the file system request to thread identifications included with data access requests to detect which data access requests of the plurality of data access requests are associated with the file system request having that thread identification.

9. The computer system of claim 6 wherein the data access requests are input-output requests and wherein when the computer system performs the step of modifying the data access requests that are associated with the file system request to include the at least one respective data access policy identifier, the computer system performs the step of:
modifying a bit field in the input-output request to contain the at least one respective data access policy identifier that identifies a memory management technique to use within the data storage system with respect to data access requests containing the at least one respective data access policy identifier.

10. The computer system of claim 6 wherein when the computer system performs the step of identifying a data access policy, the computer system performs the steps of:
determining if the requirement of the computer system to access data in the data storage system is at least one of a write requirement or a read requirement; and
if the requirement of the computer system to access data in the data storage system is a write requirement, selecting a write data access policy; and
if the requirement of the computer system to access data in the data storage system is a read requirement, selecting a read data access policy.

11. The computer system of claim 6 wherein the memory management technique defined by the data access policy defines a memory management technique that controls at least one of a caching behavior and a prefetch behavior with the data storage system.

* * * * *